United States Patent
Yun et al.

(10) Patent No.: US 8,581,451 B2
(45) Date of Patent: Nov. 12, 2013

(54) MAGNETIC VIBRATION MOTOR FOR PORTABLE TERMINAL WITH IMPROVED YOKE ATTACHMENT

(75) Inventors: In-Kuk Yun, Suwon-si (KR); Eun-Hwa Lee, Suwon-si (KR); In Kim, Suwon-si (KR); Yu-Dong Bae, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 462 days.

(21) Appl. No.: 12/622,015

(22) Filed: Nov. 19, 2009

(65) Prior Publication Data

US 2010/0127581 A1 May 27, 2010

(30) Foreign Application Priority Data

Nov. 24, 2008 (KR) ................. 10-2008-0117101

(51) Int. Cl.
*H02K 35/02* (2006.01)
*H02K 33/02* (2006.01)
*H02K 33/06* (2006.01)
*H02K 35/00* (2006.01)

(52) U.S. Cl.
USPC .............. 310/25; 310/12.16; 310/21; 310/29; 310/37

(58) Field of Classification Search
USPC ........ 310/25, 24, 12.16, 12.15; 335/222, 223; 417/417
IPC ...................................................... H02K 35/02
See application file for complete search history.

(56) References Cited

U.S. PATENT DOCUMENTS

| | | | |
|---|---|---|---|
| 6,611,606 B2* | 8/2003 | Guenther ................... 381/421 |
| 7,224,090 B2* | 5/2007 | Oh et al. ..................... 310/14 |
| 2005/0285454 A1* | 12/2005 | Choi et al. .................. 310/14 |
| 2007/0140522 A1* | 6/2007 | Stewart ....................... 381/421 |
| 2007/0164616 A1* | 7/2007 | Kuwabara et al. ............. 310/15 |
| 2007/0194635 A1* | 8/2007 | Miura ........................ 310/15 |

FOREIGN PATENT DOCUMENTS

JP  2003047090 A  *  2/2003

OTHER PUBLICATIONS

Machine translation of JP2003-047090.*
"Flat." Dictionary.com Unabridged. Random House, Inc. Jul. 30, 2012. <Dictionary.com http://dictionary.reference.com/browse/flat>.*
"Annular." Collins English Dictionary—Complete & Unabridged 10th Edition. HarperCollins Publishers. Jul. 30, 2012. <Dictionary.com http://dictionary.reference.com/browse/annular>.*

* cited by examiner

*Primary Examiner* — Burton Mullins
*Assistant Examiner* — Michael Andrews
(74) *Attorney, Agent, or Firm* — The Farrell Law Firm, P.C.

(57) ABSTRACT

Disclosed is a vibration motor for a portable terminal, including a flat spring; a cylindrical magnetic substance mounted on the flat spring; an annular magnetic substance disposed around the cylindrical magnetic substance mounted on the flat spring; and a coil disposed between the cylindrical magnetic substance and the annular magnetic substance, wherein the magnetic substances perform a linear reciprocal movement by the electromagnetic force generated between the magnetic substances and the coil and by the elastic force of the flat spring as an electric current is applied to the coil. The vibration motor operates at higher resonant frequencies than those of conventional vibration motors, thereby improving the sense of an after-vibration and realizing a delicate haptic feedback function.

12 Claims, 4 Drawing Sheets

MAGNETIC VIBRATION MOTOR FOR PORTABLE TERMINAL WITH IMPROVED YOKE ATTACHMENT

PRIORITY

This application claims the priority under 35 U.S.C. §119 (a) to an application filed in the Korean Industrial Property Office on Nov. 24, 2008 and assigned Serial No. 10-2008-0117101, the contents of which are incorporated herein by reference.

BACKGROUND OF THE INVENTION

1. Field of the Invention

The present invention relates to a portable terminal, and, more particularly, to a vibration motor for a portable terminal capable of providing a haptic feedback function.

2. Description of the Related Art

In general, the term haptic feedback includes a driving force feedback function, such as the type used for remote control of a robot arm, and refers to a method of information feedback based on the sense of touch or user skin contact. Recently, efforts have been made to utilize haptic feedback as a vibration function to inform users of when a call is received as well as a notice function to confirm the correct signal input of a selected key when manipulating the touch screen of a portable terminal such as a cellular phone.

A portable terminal generally provides a vibration mode as one method to provide notice to users of when a call or a message is received. To perform such a vibration mode, the portable terminal is provided with a vibration motor.

In consideration of the mobility of the portable terminal, typically a coin type, a cylinder type or bar type motor is used for the vibration motor. These motor types, however, are directed to provide only the notice function of receiving a call or a message.

Recently, a touch screen phone capable of providing a full-browsing screen for using the Internet or the like has been proposed. In that regard, an input device such as a keypad is also employed as a virtual keypad presented on the touch screen. A touch screen keypad senses a spot where a person touches with a finger and inputs a signal value assigned to that corresponding spot. In contrast, a conventional button type keypad can recognize manipulations of the keypad and haptically provide users with the sense of clicking with a dome switch or the like. Accordingly, users who are familiar with keypad arrangements may realize the numbers or characters being input. On the other hand, since the keypad employed in the touch screen cannot provide the same sense of clicking as that of the dome switch, users have to directly check the value to be input through a display device.

Hence, much effort has been placed on removing the users' inconvenience to check the input value through the display device by providing a haptic feedback function to the portable terminal which employs an input device adopting a touch screen method. Such a haptic feedback function of the portable terminal can be accomplished by operating a vibration motor as a user manipulates the touch screen.

Conventional coin type or bar type vibration motors, however, have a limitation in performing the haptic feedback function because of their long response time. In other words, the coin type or bar type vibration motor has an after-vibration; that is, there is a long operation time during which the motor continues to operate due to inertia until it finally stops after the vibration motor completes its operation. Therefore, users have difficulties in haptically recognizing whether the signal value of the selected key is correctly input while making continuous key inputs at high speeds.

In the alternative, a linear motor with low power consumption and a high reliability has been proposed as a modified vibration motor with a short response time. But such a conventional linear motor has drawbacks in that it has only one value of resonant frequency. In addition, the vibration force abruptly decreases with only a slight deviation of about 2 to 3 Hz from the resonant frequency. Furthermore, the linear motor employed in the conventional portable terminal has a resonant frequency in the range from 150 to 200 Hz, and such a range of resonant frequency is enough to perform the notice function of receiving a call or message through a simple vibration movement. However, such a resonant frequency range reveals limitations in providing the haptic feedback function to acknowledge users' manipulations on the touch screen.

SUMMARY OF THE INVENTION

Accordingly, the present invention has been made to solve the above-mentioned problems occurring in conventional devices, and the present invention provides a vibration motor for a portable terminal capable of providing a reliable haptic feedback function even during fast input via a touch screen.

Also, the present invention provides a vibration motor for a portable terminal which is easily controllable and generates a sufficient vibration force while manipulating a touch screen as it is operated over a broader frequency band.

Further, the present invention provides a vibration motor for a portable terminal which helps users easily recognize key inputs on a touch screen when realizing a haptic feedback function as it has a high resonant frequency.

In accordance with an aspect of the present invention, there is provided a vibration motor for a portable terminal, including a flat spring; a cylindrical magnetic substance mounted on the flat spring; an annular magnetic substance disposed around the cylindrical magnetic substance and mounted on the flat spring; and a coil disposed between the cylindrical magnetic substance and the annular magnetic substance, wherein the magnetic substances perform a linear reciprocal movement both by the electromagnetic force generated between the magnetic substances and the coil and by the elastic force of the flat spring as an electric current is applied to the coil.

The flat spring includes a circular inner securing member; a circular outer securing member disposed around the inner securing member; and a spiral connecting member connecting the inner securing member and the outer securing member.

The vibration may further include a yoke attached to a bottom surface of the recess, the magnetic substances may be attached to the yoke, and the yoke may include a coupling protrusion which extends from one side of the yoke through a weight and a inner securing member, for coupling with the inner securing member.

In the vibration motor, a disc type yoke with a diameter corresponding to the outer diameter of the annular magnetic substance is attached to the upper portion of the magnetic substances, and another disc type yoke and the annular yoke each corresponding to the respective cross-sectional shapes of the cylindrical magnetic substance and the annular magnetic substance are attached to the lower portion of the magnetic substances.

A vibration motor of a portable terminal according to the present invention as described above vibrates with a higher frequency than a conventional vibration motor. Therefore, the vibration motor according to the present invention can provide better vibration feeling to users for providing a haptic feedback function during touch screen operation.

Further, the conventional vibration motor has a narrow operation frequency band range (150 to 200 Hz), which causes rapid degradation of vibration force when it goes out of the corresponding frequency band range. However, a vibration motor in accordance with the present invention operates in a frequency band range of 250 to 450 Hz, which makes it easy to control the inventive vibration motor for a haptic feedback function.

Moreover, conventional vibration motors require 50 to 90 ms to reach 50 percent of the maximum vibration force during initial operation. However, the vibration motor according to the present invention requires only 10 ms for the same operation. In addition, it takes 40 to 80 ms for conventional coin-type or bar-type vibration motors to reach a level of less than 50 percent of the maximum vibration force at the end of its operation. However, a vibration motor of the present invention requires only 50 ms to attain a level less than 10 percent of the maximum vibration force at the end of its operation. Therefore, use of the vibration motor according to the present invention can reduce the sense of an after-vibration during the touch screen operation, which is advantageous in realizing the haptic feedback function.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
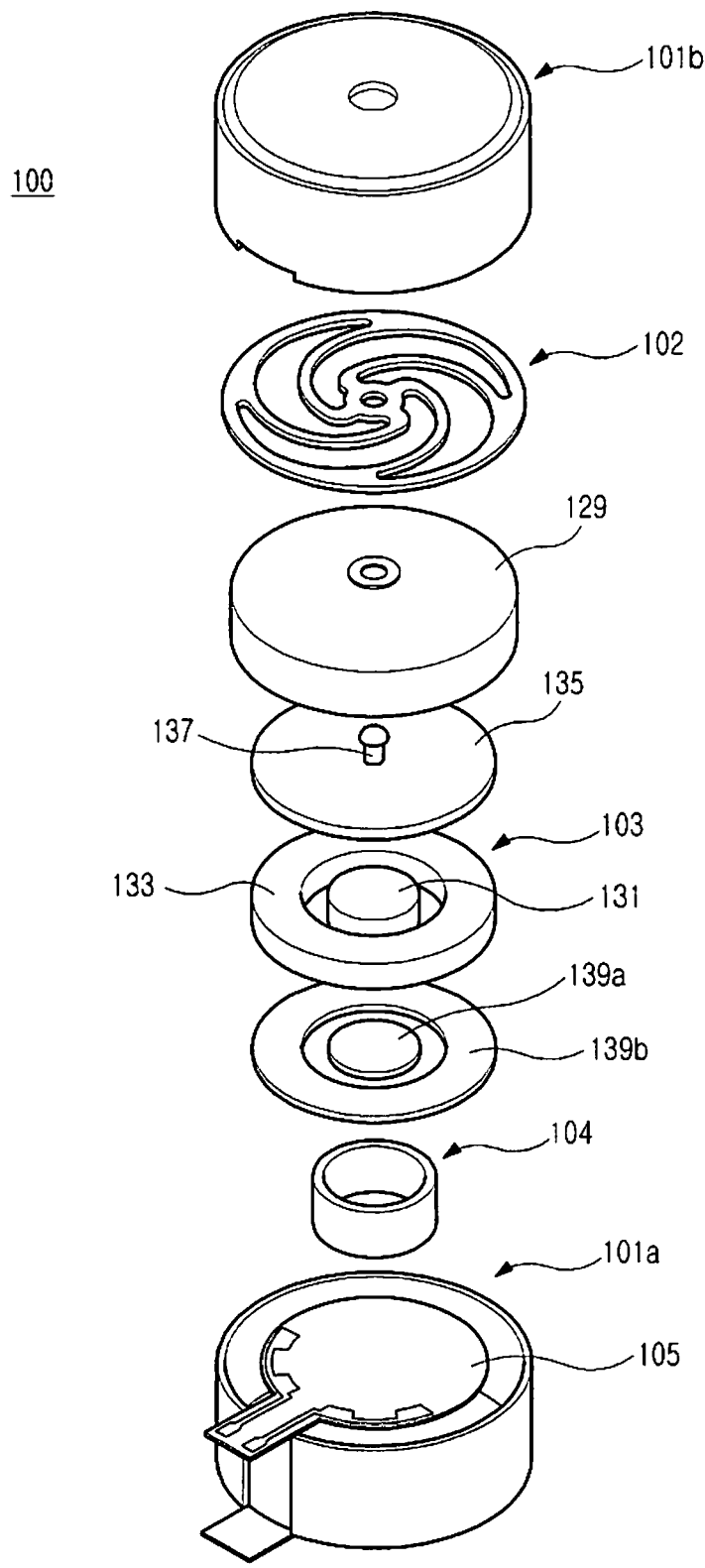
FIG. 1 is an exploded perspective view showing a vibration motor for a portable terminal in accordance with a preferred embodiment of the present invention.

Hereinafter, exemplary embodiments of the present invention will be described with reference to the accompanying drawings. In the following description, a detailed description of known functions and configurations incorporated herein will be omitted when it may make the subject matter of the present invention rather unclear.

The present invention discloses a vibration motor for a portable terminal, wherein a coil is disposed between a pair of magnetic substances which are concentrically arranged to each other, and the magnetic substances are supported through an elastic body, so that the vibration motor can be vibrated by both an electromagnetic force generated between the magnetic substances and the coil and by an elastic force of the elastic body. In this regard, a weight can be used to adjust the resonant frequency thereof, and the magnetic substances can be coupled to the elastic body using the weight.

Referring now to FIGS. 1 through 4, a vibration motor 100 for a portable terminal in accordance with a preferred embodiment of the present invention is disclosed. A cylindrical magnetic substance 131 and an annular magnetic substance 133 are concentrically disposed on a flat spring 102. Preferred materials from which the cylindrical and annular magnetic substances are constructed include Neodymium (Nd), Iron (Fe) and Boron (B). A coil 104 is positioned between the magnetic substances 131 and 133, so that vibration is generated by the electromagnetic force and the elastic force there between. The magnetic substances 131 and 133 are coupled to the flat spring 102 through a weight 129.

When a power source is applied to the coil 104, the magnetic substances 131 and 133 are floated by the electromagnetic force generated between the coil 104 and the magnetic substances 131 and 133, which assists in deforming the flat spring 102. The flat spring 102 deformed by the floating action of the magnetic substances 131 and 133 stores elastic energy therein, which will serve as a driving force to restore an initial shape thereof. Accordingly, the electromagnetic forces generated between the coil 104 and the magnetic substances 131 and 133 and the elastic forces of the flat spring 102 interactively operate to vibrate the vibration motor 100.

Figure 2:
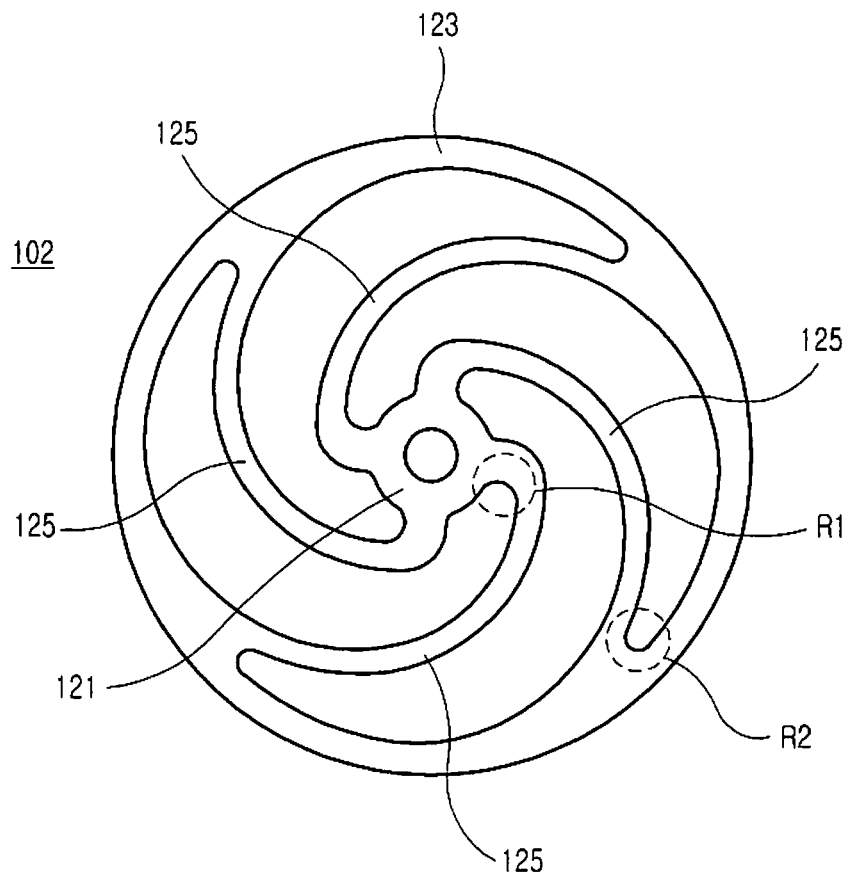
FIG. 2 is a top plan view showing a flat spring of the vibration motor shown in FIG. 1.
Figure 3:
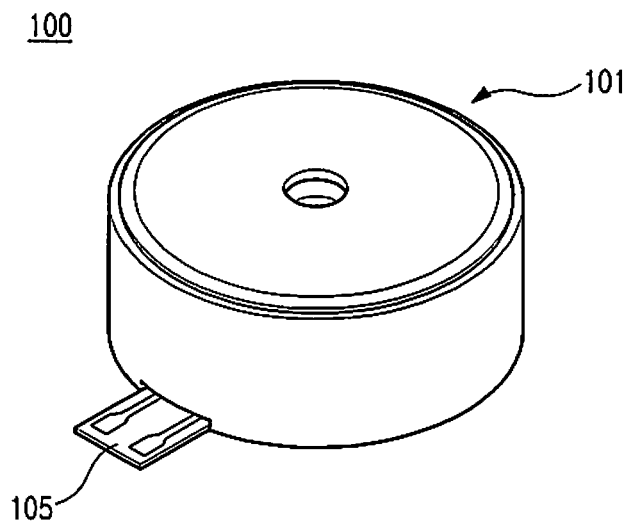
FIG. 3 is a perspective view showing the vibration motor shown in FIG. 1.

Referring to FIG. 2, in the present embodiment, the flat spring 102 includes an inner securing member 121, an outer securing member 123, and a connecting member 125.

The inner securing member 121 having a circular strip shape is designed to fixedly secure the magnetic substances 131 and 133 thereto. The outer securing member 123 has a circular strip shape surrounding the inner securing member 121. The inner securing member 121 is connected to the outer securing member 123 by the connecting member 125. In FIG. 2, there is shown an example where a plurality of connecting members 125 spirally extend, with four connecting members 125 disposed at equal angular spacing, resulting in an overall shape of the connecting member 125 and the flat spring 102 in the form of a vortex.

Meanwhile, a preferred embodiment has four connecting members 125. Alternatively, the number of the connecting members 125 can be varied, preferably based on factors that include an elastic coefficient (k) of the flat spring 102 and the vibration force of the vibration motor to be manufactured. When selecting the number of connecting members 125 with the same specifications, it can be appreciated by those skilled in the art that the smaller the load imposed on the connecting member 125, the easier its durability will be obtained there from. In the present embodiment using four connecting members, the maximum stress acting on each connecting member is 10.734 MPa. Alternatively, when three connecting members with the same specifications are adopted to produce the same vibration force, the maximum stress acting on each connecting member is 14.775 MPa. In that regard, the number of connecting members 125 may be easily selected by those skilled in the art. Therefore, it should be noted that the present embodiment describes as an example use of four connecting members.

The magnetic substances 131 and 133 supported by the flat spring 102 serve as a vibrator in the vibration motor 100, floating by interactive actions with the coil 104. When each magnetic substance 131 or 133 is coupled to the flat spring 102, the cylindrical magnetic substance 131 can be directly secured to the inner securing member 121. In contrast, the annular magnetic substance 133 should be disposed around the cylindrical magnetic substance 131 and further supported by the flat spring 102. In this regard, the magnetic substances 131 and 133 float due to the elastic deformation of the flat spring 102, and the magnetic substances 131 and 133 should not interrupt the deformation of the flat spring 102. Accordingly, it should be noted that the annular magnetic substance 133 is positioned in a manner that does not interrupt deformation of the flat spring 102. Specifically, the magnetic substances 131 and 133 are not directly affixed to the connecting member 125.

In the present embodiment, the magnetic substances 131 and 133 are not directly attached or secured to the flat spring 102, but rather are coupled to the flat spring 102 through a yoke 135 and a weight 129. In the alternative, the yoke 135 and the weight 129 might not be used to couple the magnetic substances 131 and 133 to the flat spring 102 depending on a design option.

The yoke 135 is installed to control the electromagnetic forces generated between the magnetic substances 131 and 133 and the coil 104, so that they can act interactively on each other in a certain range, while the weight 129 is positioned to control the resonant frequency thereof. The vibration motor 100 in accordance with the preferred embodiment of the present invention connects the magnetic substances 131 and 133 to the flat spring 102 using the yoke 135 and the weight 129.

The weight 129 is provided with a recess 129a on one side thereof for containing the magnetic substances 131 and 133. The yoke 135 is in the form of a disc with a diameter corresponding to the outer diameter of the annular magnetic substance 133, and the yoke 135 is attached to the bottom surface of the recess 129a. Here, the yoke 135 is formed with a coupling protrusion 137 on one side thereof, which penetrates through the weight 129 and couples to the flat spring 102, specifically the inner securing member 121. With this arrangement, the weight 129 is fixedly secured to the inner securing member 121 of the flat spring 102.

Figure 4:
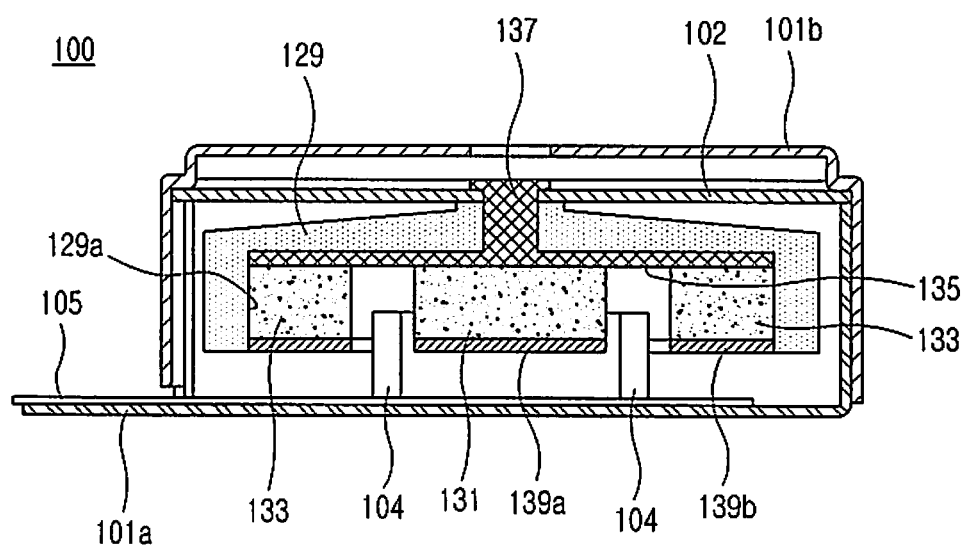
FIG. 4 is a cross-sectional view of the vibration motor shown in FIG. 3.

As shown in FIG. 4, it should be noted that the other side of the weight 129 must be formed with a protruding central portion, and a lowered peripheral portion. That is because the weight 129 is prevented from directly coming in contact with the connecting member 125 when the magnetic substances 131 and 133 move upward by the electromagnetic force generated between the magnetic substances 131 and 133 and the coil 104.

Among the magnetic substances 131 and 133, the cylindrical magnetic substance 131 is attached to the central portion of the yoke 135, while the annular magnetic substance 133 is attached to a peripheral portion thereof. In this regard, the outer surface of the annular magnetic substance 133 is preferably in close contact with an inner surface of the recess 129a formed in the weight 129. As described above, though the cylindrical magnetic substance 131 may be secured directly to the inner securing member 121 of the flat spring 102, it should be noted that the magnetic substances 131 and 133 are secured to the flat spring 102 using the yoke 135 and the weight 129, as described in the present embodiment. In other words, the weight 129 is employed to control the resonant frequency of the vibration motor 100; hence, if the resonant frequency can be obtained by only using the magnetic substances 131 and 133, the weight 129 may be omitted.

The resonant frequency of the vibration motor 100 is obtained by Equation (1) below.

$$f = \frac{1}{2\pi}\sqrt{\frac{k}{m}} \quad (1)$$

In Equation (1), k is the elastic coefficient of the flat spring 102 and m is the mass of the vibrator, which corresponds to the sum of the masses of the magnetic substances 131 and 133, the yoke 135, and the weight 129 in the present embodiment.

According to Equation (1), it can be appreciated that the resonant frequency of the vibration motor 100 can be controlled by adjusting the elastic coefficient (k) of the flat spring 102 and the mass (m) of the magnetic substances 131 and 133, the yoke 135, and the weight 129.

Meanwhile, it is desirable that the yoke 135 is also attached to the lower portion of the magnetic substances 131 and 133. In this regard, the yoke 135 which is attached to the lower portion of the magnetic substances 131 and 133 includes a disc yoke 139a and an annular yoke 139b. The disc yoke 139b conforms to the cross-sectional shape of the cylindrical magnetic substance 131, while the annular yoke 139b corresponds to the cross-sectional shape of the annular magnetic substance 133.

By disposing the respective yokes 135, 139a and 139b at the upper or lower portions of the magnetic substances 131 and 133, the magnetic forces of those magnetic substances 131 and 133 are focused on an area between the upper yoke 135 and the lower yokes 139a and 139b, thereby enhancing the electromagnetic force generated by the interactive action with the coil 104. As a result of such configurations, power consumption of the coil 104 is reduced.

The vibration motor 100 is provided with a circuit board 105 for applying power to the coil 104. The circuit board 105 can be manufactured from proper material selected from a rigid circuit board or a flexible circuit board. To mount the vibration motor 100 in a portable terminal, it is preferable to reduce the size of the vibration motor 100 by adopting the flexible circuit board.

The present vibration motor 100 can be constituted in the form of a module by containing all the components described above in a housing 101 as shown in FIG. 3. The housing 101 is constructed by joining a cylindrical upper case 101b with a lower case 101a shown if FIG. 1. The circuit board 105 extends from the housing 101 and is fixedly secured to the bottom surface of the lower case 101a, and the coil 104 is also secured onto the circuit board 105. Accordingly, the coil 104 is retained within the housing 101 in a fixed state.

The periphery of the flat spring 102 is secured to the housing 101, specifically the upper case 101b of the housing 101. As shown in FIG. 4, the upper case 101b is provided with a stepped surface in a peripheral direction on the inner wall thereof. The outer securing member 123 of the flat spring 102 is secured to the stepped surface of the upper case 101b. With these configurations, the inner securing member 121 of the flat spring 102 can be floated in an upward or downward direction within the housing 101. As the inner securing member 121 begins to float, the connecting members 125 are to be elastically deformed. As a result, the coil 104 is fixedly secured within the housing 101, and the magnetic substances 131 and 133, the yoke 135, and the weight 129 serving as a vibrator are installed in a floatable state therein.

Figure 5:
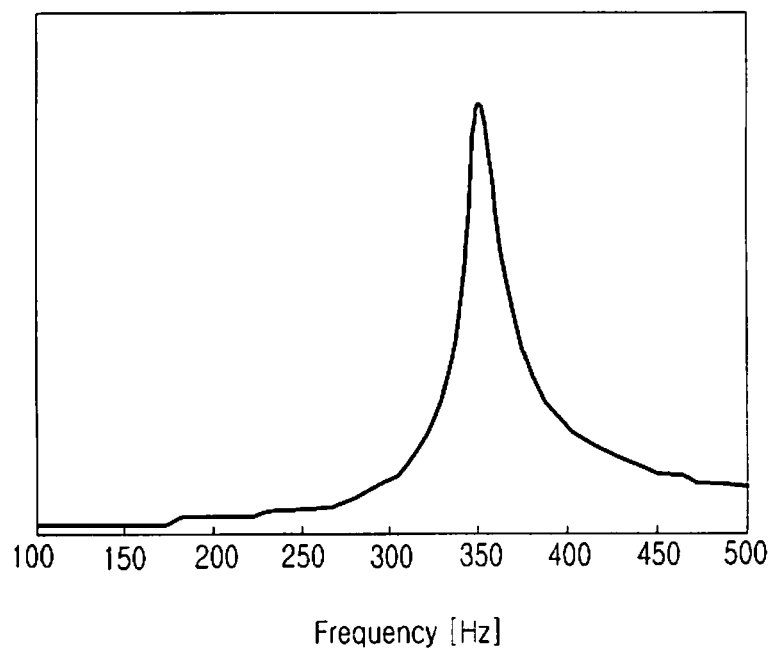
FIG. 5 is a graph illustrating the operational frequencies of the vibration motor shown in FIG. 1.

Referring to FIG. 5, it can be noted that the vibration motor 100 for a portable terminal in accordance with the present invention has a resonant frequency in the range of 250 to 450 Hz. Compared with the conventional coin or bar type vibration motor having a resonant frequency in the range of 150 to 200 Hz, the inventive vibration motor 100 is resonant in much higher frequency bands, thereby allowing users to feel the sense of manipulating the touch screen via vibrations with more delicate and various frequencies via haptic feedback.

Figure 6:
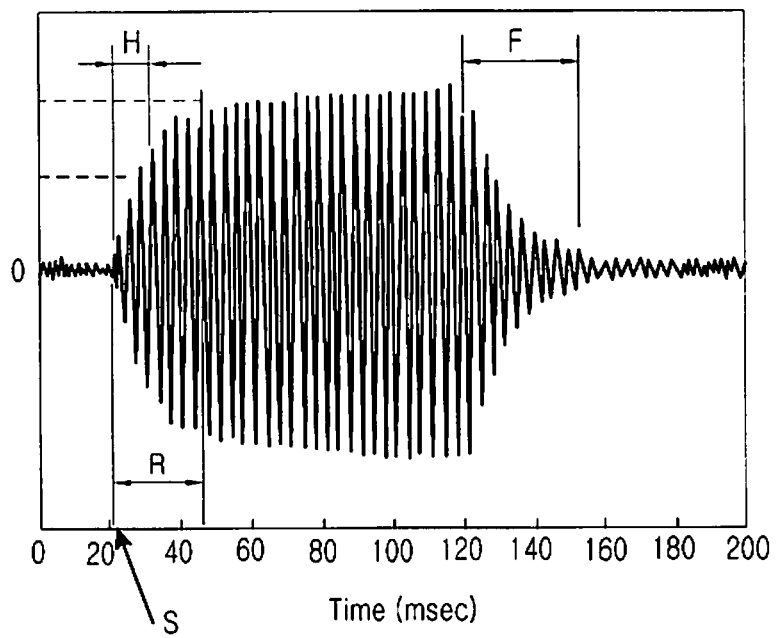
FIG. 6 is a graph illustrating the operational features of the vibration motor shown in FIG. 1.

Referring to FIG. 6, with the vibration motor 100 for a portable terminal in accordance with the present invention, it can be appreciated that an initial ascending time (H) to attain 50 percent of the maximum vibration force takes approximately 10 ms at its initial operation (S), and an ascending time (R) to attain the maximum vibration force does not take more than 30 ms. As described above, the conventional vibration motors took 50 to 90 ms to reach 50 percent of the maximum vibration force at its initial operation. In other words, it can be noted that the present vibration motor 100, compared with the conventional vibration motors, is capable of reducing the ascending time to attain the maximum vibration force at its initial operation to a level less than half of that in the conventional vibration motors.

In addition, with the vibration motor 100 for the portable terminal in accordance with the present invention, it takes about 30 ms to attain a level less than 10 percent of the maximum vibration force at the end of its operation. It can be noted that the vibration force of the present invention is remarkably lowered in a short period of time compared with conventional vibration motors. As described above, it takes 40 to 80 ms for conventional vibration motors to reach a level less than 50 percent of the maximum vibration force.

The flat spring is preferably formed in a thickness of 0.15 mm. The radius (R1, R2) of the curvature of the portion, in which the connecting members 125 are connected to the inner securing member 121 or outer securing member 123, is preferably limited to 0.2 mm to 0.25 mm. When using the flat spring 102 having four connecting members with those specifications above, the maximum load being applied to the flat spring 102 by the vibration of the vibration motor 100 is 10.734 MPa as described above. When the radius (R1, R2) of curvature is 0.2 mm, the resonant frequency of the vibration motor 100 is obtained at around 299.6 Hz. The resonant frequency is obtained at 315.0 Hz when the radius of curvature (R1, R2) is 0.25 mm.

In short, it can be noted that the vibration motor 100 for a portable terminal in accordance with the present invention remarkably improves both the ascending time to attain a specific vibration force at the initial operation and the descending time to obtain a certain vibration force at the termination of the operation. Accordingly, when users make key inputs through the touch screen of the portable terminal having the inventive vibration motor 100, they are able to recognize specific vibrations each corresponding to a particular key input in spite of fast key manipulations. Further, since the present vibration motor 100 is operated at higher frequencies than the conventional vibration motor, users can recognize, through delicate vibrations, that key inputs are being made accordingly.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A vibration motor for a portable terminal, the vibration motor comprising:
    a flat spring including a circular inner securing member and a circular outer securing member disposed around the circular inner securing member;
    a cylindrical magnetic substance mounted on the flat spring;
    an annular magnetic substance disposed around the cylindrical magnetic substance and mounted on the flat spring;
    a yoke coupled to the flat spring; and
    a weight having a recess on one side and secured to the circular inner securing member, wherein the yoke is attached to a bottom surface of the weight; and
    a coil disposed between the cylindrical magnetic substance and the annular magnetic substance,
    wherein the cylindrical magnetic substance and the annular magnetic substance are attached to the yoke,
    wherein the magnetic substances perform a linear reciprocal movement by an electromagnetic force generated between the magnetic substances and the coil and by an elastic force of the flat spring as electric current is applied to the coil, and
    wherein the yoke includes a coupling protrusion which extends from one side of the yoke and penetrates through the weight and the inner securing member, to be coupled with the inner securing member.

2. The vibration motor of claim 1, wherein the flat spring further includes a spiral connecting member connecting the inner securing member and the outer securing member, wherein the cylindrical magnetic substance is secured to the inner securing member via the yoke.

3. The vibration motor of claim 2, wherein the magnetic substances are secured within the recess.

4. The vibration motor of claim 2, further comprising a housing which contains the flat spring, the magnetic substances and the coil, wherein an inner wall of the housing is provided with a stepped surface to which the outer circular securing member is fixedly secured.

5. The vibration motor of claim 2, wherein the flat spring includes a plurality of connecting members spirally disposed at equal angular spacing, and wherein a radius curvature where the circular inner securing member connects to the circular outer securing member is within a range of 0.2 mm to 0.25 mm.

6. The vibration motor of claim 5, wherein a thickness of the plurality of connecting members is 0.15 mm.

7. The vibration motor of claim 1, further comprising a second yoke attached to the opposite portions of the cylindrical and annular magnetic substances.

8. The vibration motor of claim 7, wherein the yoke is a first disc type yoke with a diameter corresponding to an outer diameter of the annular magnetic substance, wherein the first disc type yoke is attached to an upper portion of each of the cylindrical and annular magnetic substances, wherein the second yoke includes a second disc type yoke having a cross-sectional shape that corresponds to a cross-sectional shape of the cylindrical magnetic substance and an annular yoke having a cross-sectional shape that corresponds to a cross-sectional shape of the annular magnetic substance, and wherein the second disc type yoke and the annular yoke attach to a lower portion of the cylindrical magnetic substance and the annular magnetic substance, respectively.

9. The vibration motor of claim 1, further comprising a housing which contains the flat spring, the magnetic substances and the coil, wherein the magnetic substances are installed within the housing through the flat spring, and wherein the coil is fixedly secured within the housing.

10. The vibration motor as recited in claim 9, wherein the housing is constructed by joining an upper case with a lower case, and wherein the flat spring is fixedly secured to the upper case.

11. The vibration motor as recited in claim 10, further comprising a circuit board extending from the housing and fixedly secured to the lower case, wherein the coil is mounted on the circuit board.

12. The vibration motor as recited in claim 10, further comprising a stepped surface formed at an inner wall of the upper case, wherein the peripheral portion of the flat spring is fixedly secured to the stepped surface.

* * * * *